United States Patent
Kashiwagi

(10) Patent No.: US 8,378,051 B2
(45) Date of Patent: Feb. 19, 2013

(54) SILICONE RESIN LENS AND A METHOD FOR PREPARING THE SAME

(75) Inventor: Tsutomu Kashiwagi, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 76 days.

(21) Appl. No.: 13/165,273

(22) Filed: Jun. 21, 2011

(65) Prior Publication Data
US 2011/0313123 A1 Dec. 22, 2011

(30) Foreign Application Priority Data
Jun. 22, 2010 (JP) .................... 2010-141689

(51) Int. Cl.
*C08G 77/12* (2006.01)
*C08G 77/20* (2006.01)
*G02B 3/00* (2006.01)

(52) U.S. Cl. ............... 528/40; 528/10; 528/31; 528/32; 264/1.32

(58) Field of Classification Search .............. 528/40
See application file for complete search history.

(56) References Cited

U.S. PATENT DOCUMENTS

| | | | |
|---|---|---|---|
| 6,285,513 B1 | 9/2001 | Tsuji et al. | |
| 6,815,520 B2 * | 11/2004 | Yoneda et al. | 528/31 |
| 7,323,250 B2 * | 1/2008 | Tabei et al. | 428/447 |
| 2006/0264567 A1 | 11/2006 | Shiobara et al. | |
| 2006/0264583 A1 | 11/2006 | Kashiwagi et al. | |
| 2007/0249790 A1 * | 10/2007 | Kashiwagi et al. | 525/478 |
| 2008/0015326 A1 * | 1/2008 | Kodama et al. | 528/15 |
| 2010/0197870 A1 * | 8/2010 | Kashiwagi et al. | 525/475 |

FOREIGN PATENT DOCUMENTS

| | | |
|---|---|---|
| JP | 2000-017176 A | 1/2000 |
| JP | 2000-231002 A | 8/2000 |
| JP | 2004-221308 A | 8/2004 |
| JP | 2006-324596 A | 11/2006 |
| JP | 2006-328102 A | 12/2006 |
| JP | 2006-328103 A | 12/2006 |

* cited by examiner

*Primary Examiner* — Robert S Loewe

(74) *Attorney, Agent, or Firm* — Birch, Stewart, Kolasch & Birch, LLP

(57) ABSTRACT

The present invention provides a silicone resin lens obtained by molding and curing a silicon resin composition into a lens, wherein the lens has a refractive index at 400 nm of 1.5 or more, a ratio of a refractive index at 400 nm to a refractive index at 596 nm of 1.01 or more, an Abbe's number of 45 or more, and an absolute value of a differential of refractive indexes against temperatures, dn/dT, of $250 \times 10^{-6}$/degrees C. or less. Further, the present invention provides a method for preparing the silicone resin lens according to any one of claims 1 to 3, wherein the silicone resin lens is prepared in conditions where a ratio of a molding shrinkage ratio found after subjecting the silicone resin composition to post-cure to a molding shrinkage ratio found after subjecting the silicone resin composition to molding is 0.8 to 1.2.

3 Claims, 1 Drawing Sheet

SILICONE RESIN LENS AND A METHOD FOR PREPARING THE SAME

CROSS REFERENCE

This application claims the benefits of Japanese Patent Application No. 2010-141689 filed on Jun. 22, 2010, the contents of which are herein incorporated by reference.

FIELD OF THE INVENTION

The present invention relates to a silicone resin lens and a method for preparing the same.

Previously, lenses which are used for focusing an image, such as an image obtained from CMOS sensors, have been molded out of thermoplastic resins having good transparency, such as acrylic resins and polycarbonate resins. This kind of lenses can be easily prepared by mechanical molding, such as injection molding. In the injection molding of a thermoplastic resin, a resin is melted at a high temperature, casted in a mold which is set at a low temperature and cooled to solidify. Therefore, a molding product having a desired shrinkage ratio can be obtained by properly setting the temperature of a mold.

However, in recent years, when a CMOS sensor package provided with this kind of lens for forming an image is mounted on a substrate, a lead-free solder has been commonly used. A mounting temperature is set at a high temperature of 260 degrees C. and, therefore, lenses prepared from conventional thermoplastic resins cause such problems that deformation and yellowing of lenses occur during the reflow. Further, it is known that when an LED element is a blue LED, lenses prepared from a thermoplastic resin causes such problems that degradation and yellowing of lenses occur.

Japanese Patent Applications Laid-Open No. 2000-231002, No. 2000-17176 and No. 2004-221308 disclose optical lenses prepared from silicone resins having good ultraviolet resistance and heat resistance. The silicone resins are thermosetting and, therefore, it is casted into a mold heated to a high temperature, and is reacted to solidify. The products obtained are subjected to post-cure at a temperature higher than a molding temperature for several hours to be further cured after the molding. There, a shrinkage ratio of the resin changes, depending upon molding conditions and post-cure conditions, so that it is extremely difficult to obtain a lens having planned precise dimensions.

Japanese Patent Applications Laid-Open No. 2006-324596, No. 2006-328102 and No. 2006-328103 disclose silicon resin lenses for LEDs where a phenyl silicone resin is contained in a lens-forming silicone resin composition for good moldability, and a method for preparing the same.

PRIOR LITERATURES

Patent Literatures

[Patent Literature 1] Japanese Patent Application Laid-Open No. 2000-231002
[Patent Literature 2] Japanese Patent Application Laid-Open No. 2000-17176
[Patent Literature 3] Japanese Patent Application Laid-Open No. 2004-221308
[Patent Literature 4] Japanese Patent Application Laid-Open No. 2006-324596
[Patent Literature 5] Japanese Patent Application Laid-Open No. 2006-328102
[Patent Literature 6] Japanese Patent Application Laid-Open No. 2006-328103

DISCLOSURE OF THE INVENTION

Problems to be Solved by the Invention

The phenyl silicone resins mentioned above have high refractive indexes, but cause double refraction of light, so that there are problems that the Abbe's number is small and distortion of an image occurs. Further, when a lens is put into a case and subjected to a reflow, an expansion coefficient of a housing differs from that of the silicone, so that a resin deforms and a precise image cannot be obtained.

Means to Solve the Problems

To solve the aforesaid problems, the present inventor have made research and found a silicone resin lens which has a high Abbe's number and small dependency of a refractive index on temperatures change and provides an excellent image. Further, the present inventors have made research particularly about a relation between molding conditions and a molding shrinkage ratio of the silicone resin composition, and found conditions which give a lens having planned precise dimensions.

Thus, the present invention provides a silicone resin lens obtained by molding and curing a silicon resin composition into a lens, wherein the lens has a refractive index at 400 nm of 1.5 or more, a ratio of a refractive index at 400 nm to a refractive index at 596 nm of 1.01 or more, an Abbe's number of 45 or more, and an absolute value of a differential of refractive indexes against temperatures, dn/dT, of $250 \times 10^{-6}$/degrees C. or less.

Further, the present invention provides a method for preparing the silicone resin lens according to any one of claims 1 to 4, wherein the silicone resin lens is prepared in conditions where a ratio of a molding shrinkage ratio found after subjecting the silicone resin composition to post-cure to a molding shrinkage ratio found after subjecting the silicone resin composition to molding is 0.8 to 1.2.

Effects of the Invention

The silicone resin lens of the present invention has the high Abbe's number and a small differential of refractive indexes against temperatures, whereby, double refraction of light can be reduced and distortion of an image can be prevented. Further, the lens has good stability for a temperature, so that deformation of a resin lens during the reflow in a housing can be prevented, resulting a precise image. Further, according to the present method, an image-forming silicone resin lens having accurate dimensions can be provided. Therefore, the present silicone resin lens is suitable for use in forming an image.

BRIEF DESCRIPTION ON DRAWINGS

BEST MODES OF THE INVENTION

Figure 1:
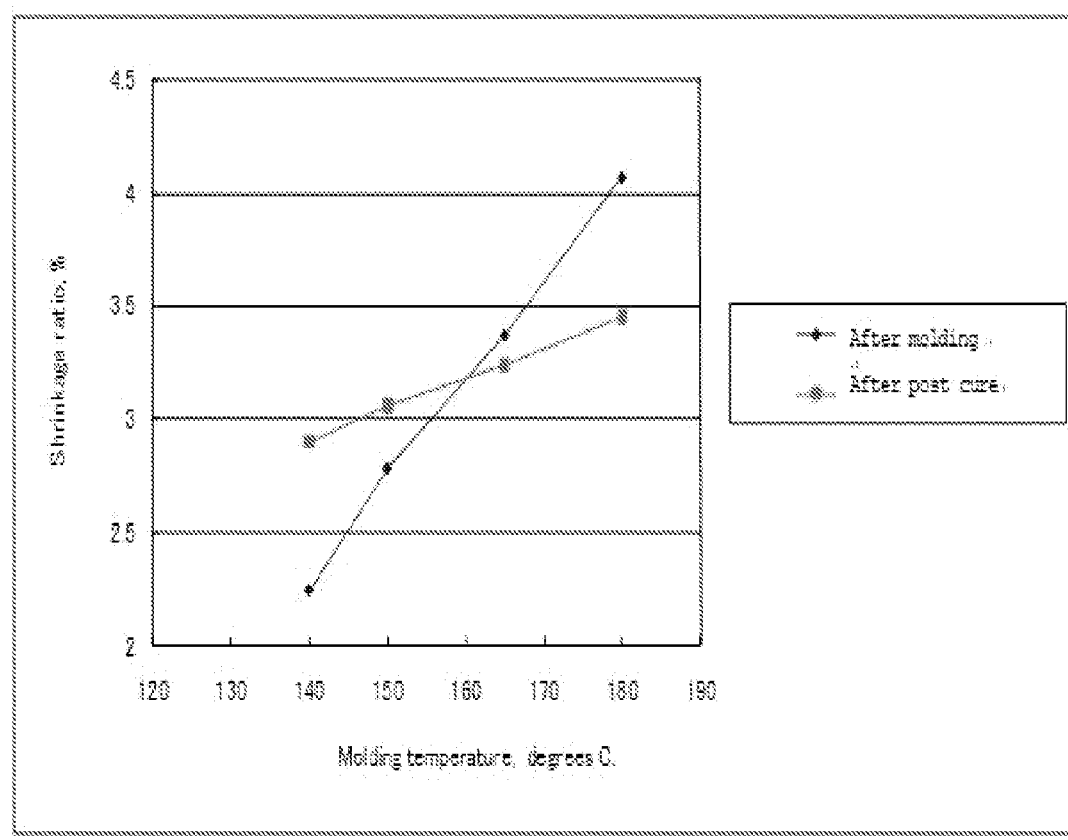
FIG. 1 is a graph which indicates a relation between a molding temperature and a shrinkage ratio of the silicone resin lenses prepared in Example 1 and Reference Examples 1 to 3.

The present silicone resin lens is obtained by molding and curing of a silicon resin composition. A ratio of a refractive index at 400 nm, $R_{400}$, to a refractive index at 596 nm, $R_{596}$, of the silicone resin lens, that is, $R_{400}/R_{596}$, is 1.01 or more, preferably 1.01 to 1.05, and a refractive index at 400 nm, $R_{400}$, is 1.5 or more, preferably 1.5 to 1.6, more preferably 1.52 to 1.59. When the refractive index falls on the aforesaid value, thickness of the lens can be thin. The refractive index in the present invention is determined at 25 degrees C. with a prism coupling method.

Further, the present silicone resin lens is characterized in that the lens has an Abbe's number of 45 or more, preferably 45 to 65, more preferably 50 to 60. Abbe's number ($\upsilon_D$) indicates a wavelength dependency of refractive indices, that is, a degree of light dispersion. The Abbe's number is defined by the following formula.

$$\upsilon_D = (n_D - 1)/(n_F - n_C)$$

wherein $n_C$, $n_D$ and $n_F$ are the refractive indices at the wavelengths of the Fraunhofer C special lines; 656 nm, D special lines; 589 nm, and F special lines; 486 nm, respectively. When the Abbe's number falls on the aforesaid value, double refraction of light is small, so that distortion of an image can be prevented.

Further, the present silicone resin lens is characterized in that a differential of refractive indexes against temperatures, indicated by "dn/dT", is small. "dn/dT" is an index for a ratio of change of a refractive index "n" to change of a temperature "T" and indicates that a refractive index "n" of the silicon resin lens changes on change of a temperature "T" in a ratio of "dn/dT". Refractive indexes of the silicone resin lens are determined at different temperatures and a value of "dn/dT" is calculated as an incline of refractive indexes against temperatures. The present silicone resin lens has an absolute value "|dn/dT|" of $250 \times 10^{-6}$/degrees C. or less, preferably $50 \times 10^{-6}$ to $250 \times 10^{-6}$/degrees C., more preferably $50 \times 10^{-6}$ to $200 \times 10^{-6}$/degrees C. When the differential of a refractive index "dn/dT" falls on the aforesaid value, the lens has good stability for a temperature, so that deformation of a resin lens during the reflow in a housing can be prevented, resulting a precise image.

Any silicone resin composition may be used for preparing the present silicone resin lens, as long as it can provide a cured product which meets the aforesaid requirements. Specifically, preferred is a silicon resin composition which comprise an alkenyl group-containing organopolysiloxane having a three-dimensional network structure, particularly a silicone resin composition which can be cured via a hydrosilylation.

A silicone resin composition comprising the following components (A) to (C) is preferred as the present silicone resin composition.

(A) an alkenyl group-containing organopolysiloxane represented by the following average compositional formula (1):

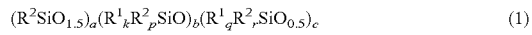  (1)

wherein $R^1$ is an alkenyl group having 2 to 8 carbon atoms, $R^2$ is a substituted or unsubstituted monovalent hydrocarbon group which is not an alkenyl group, k and p are an integer of 0, 1 or 2, provided that a total of k and p is 2, q is an integer of from 1 to 3 and r is an integer of from 0 to 2, provided that a total of q and r is 3, a, b and c are the numbers which satisfy the molar ratio equations, (b+c)/a=0.01 to 1, and c/a=0.05 to 3, and 10 to 80% of a total molar amount of the groups represented by $R^1$ and $R^2$ is a cycloalkyl group, (B) an organohydrogenpolysiloxane having at least two hydrogen atoms each bonded to a silicon atom in an amount such that the amount of the hydrogen atoms is 0.75 to 2.0 equivalents per equivalent of the alkenyl groups of component (A), and (C) a catalytic amount of a curing catalyst.

The each component will be described below in detail.

(A) Alkenyl Group-Containing Organopolysiloxane

The component (A) is an organopolysiloxane which has a three-dimensional network structure and is represented by the following average compositional formula (1):

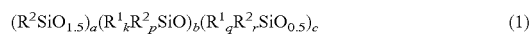  (1)

In the afore-mentioned formula, $R^1$ is an alkenyl group having 2 to 8, preferably 2 to 6, carbon atoms, $R^2$ is a substituted or unsubstituted monovalent hydrocarbon group which is not an alkenyl group. $R^2$ preferably has 1 to 10, more preferably 1 to 6, carbon atoms. Examples of $R^2$ include alkyl groups such as methyl, ethyl, propyl, isopropyl, butyl, isobutyl, and tert-butyl; aryl groups such as phenyl, tolyl, xylyl, and naphthyl groups; cycloalkyl groups such as a cyclohexyl group; aralkyl groups such as benzyl, phenylethyl and phenylpropyl groups; and those groups where a part or the whole of their hydrogen atoms are replaced with a halogen atom(s), such as fluorine, bromine and chlorine atoms, or a cyano group(s), such as halogen-substituted alkyl groups, for instance, chloromethyl, chloropropyl, bromoethyl and trifluoropropyl groups, and a cyanoethyl group. Among these, preferred is a cycloalkyl group having 4 to 8, preferably 5 to 6, carbon atoms. The organopolysiloxane has a cycloalkyl group content of 10 to 80%, preferably 15 to 70%, based on the total molar amount of the groups represented by $R^1$ and $R^2$. If the cycloalkyl group content is less than the aforesaid lower limit, the refractive index is low and, therefore, the thickness of the lens needs to be larger. If the cycloalkyl group content is more than the aforesaid upper limit, steric hindrance occurs. Further, the organopolysiloxane has an alkenyl group content of 2 to 45%, preferably 5 to 30%, based on the total molar amount of the groups represented by $R^1$ and $R^2$. If the alkenyl group content is less than the aforesaid lower limit, the number of cross-linkage points is small, so that the hardness of the cured product is not sufficient. If the alkenyl group content is more than the aforesaid upper limit, the cured product is brittle. Organopolysiloxans with no cycloalkyl group may be used in combination with the organopolysiloxans having a cycloalkyl group.

In the afore-mentioned formula, k and p are an integer of 0, 1 or 2, provided that a total of k and p is 2, q is an integer of from 1 to 3, and r is an integer of from 0 to 2, provided that a total of q and r is 3. A molar ratio, (b+c)/a, is preferably 0.01 to 1, more preferably 0.1 to 0.5; and a molar ratio, c/a, is preferably 0.05 to 3, more preferably 0.1 to 0.5. A weight average molecular weight of the organopolysiloxane, as determined by GPC, reduced to polystyrene, is preferably in the range of 500 to 10,000.

The organopolysiloxane may further comprise small amounts of bifunctional siloxane units and trifunctional siloxane units, that is, organosilsesquioxane units, in addition to the aforesaid $R^2SiO_{1.5}$ unit, $R^1_kR^2_pSiO$ unit, and $R^1_qR^2_rSiO_{0.5}$ unit, as long as the purposes of the present invention are not obstructed.

The organopolysiloxane having a resin structure can be easily prepared by combining source compounds for $R^2SiO_{1.5}$ unit, $R^1_kR^2_pSiO$ unit, and $R^1_qR^2_rSiO_{0.5}$ unit so b and c meet the afore-mentioned molar ratios and, for instance, subjecting them to co-hydrolysis in the presence of an acid.

As the source compound for $R^2SiO_{1.5}$ unit, use may be made of cyclohexyltrichlorosilane, cyclohexyltrimethoxysilane, cyclohexyltriethoxysilane, phenyltrimethoxysilane and methyltrimethoxysilane.

As the source compound for $R^1_kR^2_pSiO$ unit, the following compounds can be used:

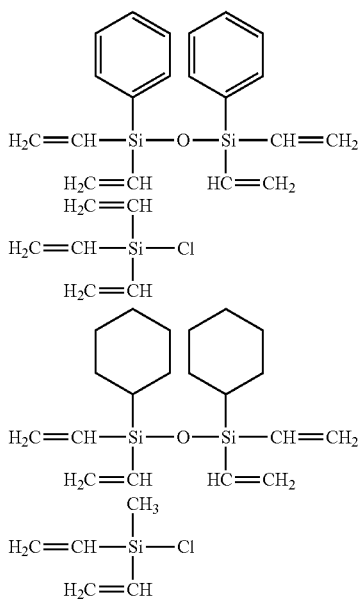

As the source compound for $R^1{}_qR^2{}_rSiO_{0.5}$ unit, the following compounds can be used:

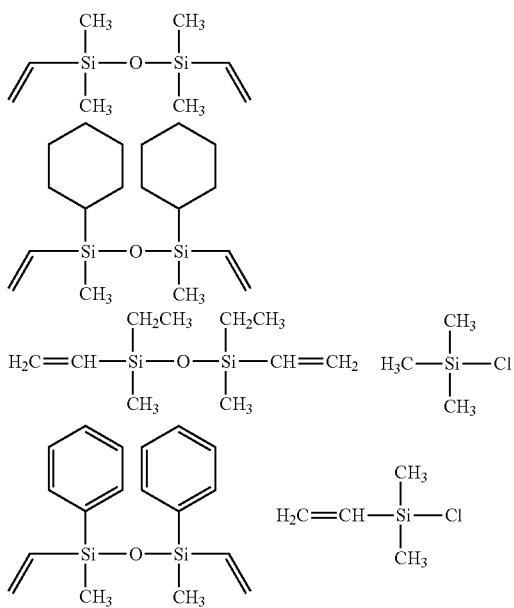

A liner alkenyl group-containing organopolysiloxane can be used for the present silicone resin composition in the place of the afore-mentioned alkenyl group-containing organopolysiloxane having a three-dimensional network structure. Any liner organopolysiloxane maybe used, as long as it has at least two alkenyl groups per molecule and a viscosity at 25 degrees C. of 10 to 1,000,000 mPa·s, preferably 50 to 100,000 mPa·s.

Particularly, an organopolysiloxane represented by the following average compositional formula (2) is preferred.

$$R^3{}_d(R^4)_e(R^5)_f SiO_{(4-d-e-f)/2} \quad (2)$$

In the afore-mentioned formula (2), $R^3$ is a cycloalkyl group having 4 to 8, preferably 5 to 6, carbon atoms. $R^4$ is a substituted or unsubstituted monovalent hydrocarbon group which has 1 to 10, preferably 1 to 6, carbon atoms and is not an alkenyl group nor a cycloalkyl group. $R^5$ is an alkenyl group having 2 to 8, preferably 2 to 6, carbon atoms. d is the number of 0.3 to 1.0, preferably 0.4 to 0.8, e is the number of 0.05 to 1.5, preferably 0.05 to 1.0 and f is the number of 0.05 to 0.8, preferably 0.05 to 0.5, provided that d+e+f is 0.4 to 2.0, preferably 0.5 to 1.2. The organopolysiloxane has a cycloalkyl group content of 10 to 80%, preferably 15 to 70%, based on the total molar amount of the groups represented by $R^3$, $R^4$ and $R^5$. Further, the organopolysiloxane has a alkenyl group content of 2 to 45%, preferably 5 to 30%, based on the total molar amount of the groups represented by $R^3$, $R^4$ and $R^5$. An organopolysiloxan with no cycloalkyl group may be used in combination with the organopolysiloxan having a cycloalkyl group.

In the afore-mentioned formula (2), examples of $R^4$ include alkyl groups such as methyl, ethyl, propyl, isopropyl, butyl, isobutyl, tert-butyl, pentyl, neopentyl, hexyl, octyl, nonyl and decyl groups; aryl groups such as phenyl, tolyl, xylyl, and naphthyl groups; aralkyl groups such as benzyl, phenylethyl and phenylpropyl groups; and those groups where a part or the whole of their hydrogen atoms are replaced with a halogen atom(s), such as fluorine, bromine and chlorine atoms, or a cyano group, such as halogen-substituted alkyl groups, for instance, chloromethyl, chloropropyl, bromoethyl and trifluoropropyl groups, and a cyanoethyl group.

In the afore-mentioned formula (2), examples of $R^5$ include vinyl, allyl, propenyl, isopropenyl, butenyl, hexenyl, cyclohexenyl and octenyl groups. Among these, vinyl and allyl groups are preferred.

The organopolysiloxane comprises a liner structure whose main chain is composed of repeating diorganosiloxane units represented by $R_2SiO_{2/2}$ and which has triorganosiloxy groups represented by $R_3SiO_{1/2}$ at the both terminals, wherein R is as defined for $R^3$, $R^4$ or $R^5$ mentioned above. Particularly, preferred for workability and curability is a liner organopolysiloxane which is represented by the following formula (3) and has each one or more alkenyl groups on a silicon atom at the both terminals and has a viscosity at 25 degrees C. of 10 to 1,000,000 mPa·s, preferably 1,000 to 50,000 mPa·s. The viscosity is determined, for instance, with a rotational viscometer. The organopolysiloxane may comprise a small amount of branched structure, for instance, trifunctional siloxane unit, in its molecular chain.

(3)

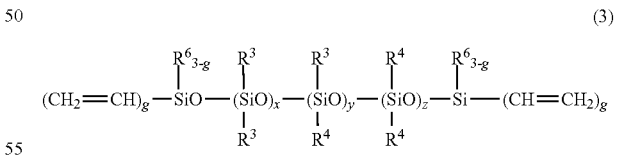

wherein, $R^3$ and $R^4$ are as defined above, $R^6$ is as defined for $R^3$ or $R^4$, g is an integer of 1, 2 or 3, and x, y and z are zero or a positive integer which satisfy the equation $1 \leq (x+y+z) \leq 1,000$, provided that at least one of x and y is 1 or larger.

In the afore-mentioned formula (3), x, y and z are zero or a positive integer which satisfy the equation $1 \leq (x+y+z) \leq 1,000$, preferably $5 \leq (x+y+z) \leq 500$, more preferably $30 \leq (x+y+z) \leq 500$, where preferably $0.5 \leq (x+y)/(x+y+z) \leq 1.0$.

Examples of the organopolysiloxanes represented by the afore-mentioned formula (3) include the following.

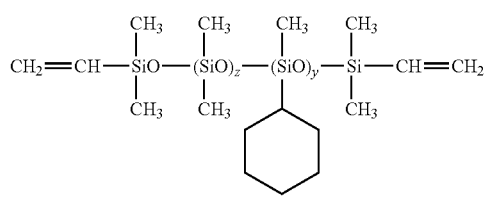

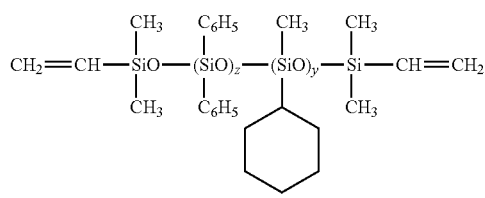

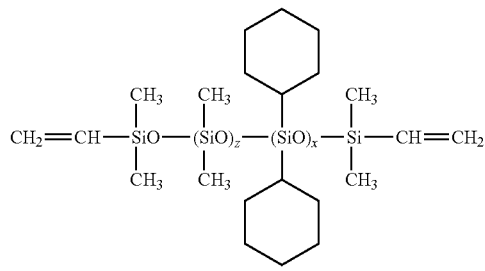

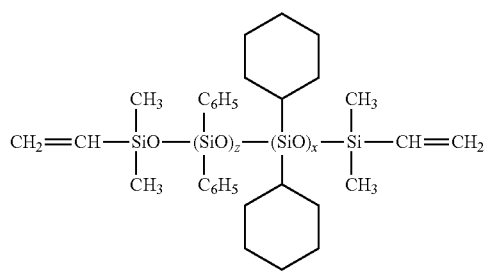

wherein x, y and z are as defined above.

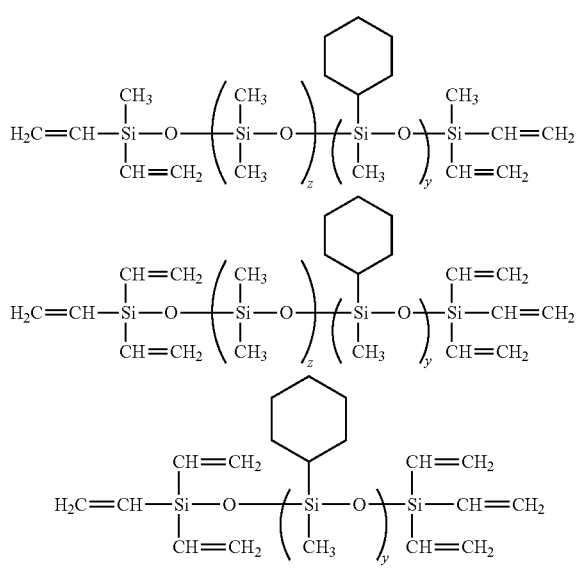

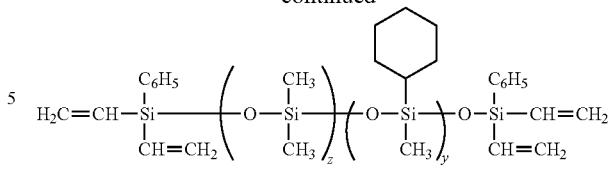

wherein z and y are as defined above.

The liner organopolysiloxan may be used in combination with the afore-mentioned organopolysiloxan having a three-dimensional network structure. The amount of the liner organopolysiloxan ranges from 0.1 to 50 parts by mass, preferably 5 to 30 parts by mass, relative to 100 parts by mass of the organopolysiloxan having a three-dimensional network structure. If the amount of the organopolysiloxane having a three-dimensional network structure is too small, the effect of improving the physical strength and tackiness of a surface of a cured product is not sufficiently attained.

(B) Organohydrogenpolysiloxane

Organohydrogenpolysiloxane (B) functions as a cross-linking agent. The hydrogen atom bonded to a silicon atom in the component (B), hereinafter called SiH group, addition reacts with the alkenyl group in the component (A) to form a cross-linked structure. Any organohydrogenpolysiloxane may be used, as long as it has at least two, preferably at least three, hydrogen atoms bonded to a silicon atom, that is, SiH groups, per molecule. The amount of the component (B) may be such that the amount of the hydrogen atoms each bonded to a silicon atom, i.e., SiH group, is 0.75 to 2.0, preferably 0.8 to 1.5, equivalents per equivalent of the alkenyl groups of component (A).

Preferred is an organohydrogenpolysiloxane represented by the following average compositional formula (4):

$$R^7_a R^8_b H_d SiO_{(4-a-b-d)/2} \qquad (4)$$

wherein $R^7$ is a cycloalkyl group having 4 to 8 carbon atoms, $R^8$ is a substituted or unsubstituted, monovalent hydrocarbon group which has 1 to 10 carbon atoms and is not an alkenyl group nor a cycloalkyl group, a is the number of 0 to 1.4, b is the number of 0.6 to 1.5, and d is the number of 0.05 to 1.0, provided that a+b+d is 1.0 to 2.5.

In the afore-mentioned formula (4), $R^7$ is a cycloalkyl group having 4 to 8, more preferably 5 to 6, carbon atoms, and a cyclohexyl group is more preferred. $R^8$ is a substituted or unsubstituted, monovalent hydrocarbon group which has 1 to 10, preferably 1 to 7, carbon atoms and is not an alkenyl group nor cycloalkyl group. Examples of $R^8$ include lower alkyl groups such as a methyl group, aryl groups such as a phenyl group and the groups as defined for $R^4$ in the afore-mentioned formula (2). a is the number of 0 to 1.4, preferably 0 to 1.0, b is the number of 0.6 to 1.5, preferably 0.8 to 1.2 and d is the number of 0.05 to 1.0, preferably 0.3 to 0.8, provided that a+b+d is 1.0 to 2.5. The hydrosilyl group may be at the terminal or in a middle part of the molecular chain, and, thus, may be present anywhere in the molecule.

Examples of the organohydrogenpolysiloxane include tris(dimethylhydrogensiloxy)methylsilane, tris(dimethylhydrogensiloxy)phenylsilane, 1,1,3,3-tetramethyldisiloxane, 1,3,5,7-tetramethylcyclotetrasiloxane, methylhydrogenpolysiloxane with both ends blocked with trimethylsiloxy groups, copolymers of dimethylsiloxane and methylhydrogensiloxane with both ends blocked with trimethylsiloxy groups, dimethylpolysiloxane with both ends blocked with dimethylhydrogensiloxy groups, copolymers of dimethylsiloxane and methylhydrogensiloxane with both ends blocked with dimethylhydrogensiloxy groups, copolymers of methylhydrogensiloxane and diphenylsiloxane with both ends blocked with trimethylsiloxy groups, copolymers of methylhydrogensiloxane, diphenylsiloxane and dimethylsiloxane with both ends blocked with trimethylsiloxy groups, copolymers composed of $(CH_3)_2HSiO_{1/2}$ units and $SiO_{4/2}$ units, and copolymers composed of $(CH_3)_2HSiO_{1/2}$ units, $SiO_{4/2}$ units and $(C_6H_5)SiO_{3/2}$ units.

Organohydrogenpolysiloxanes prepared from the units represented by the following structure can also be used.

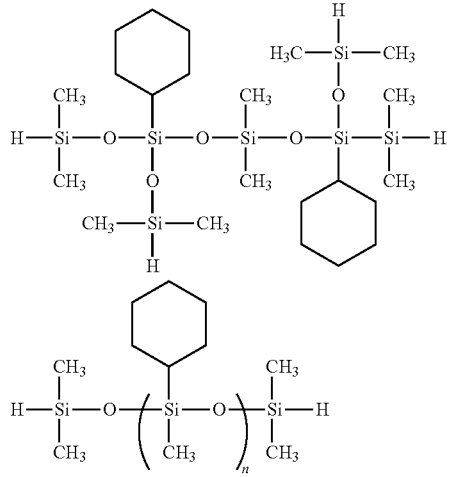

wherein n is an integer of from 1 to 10.

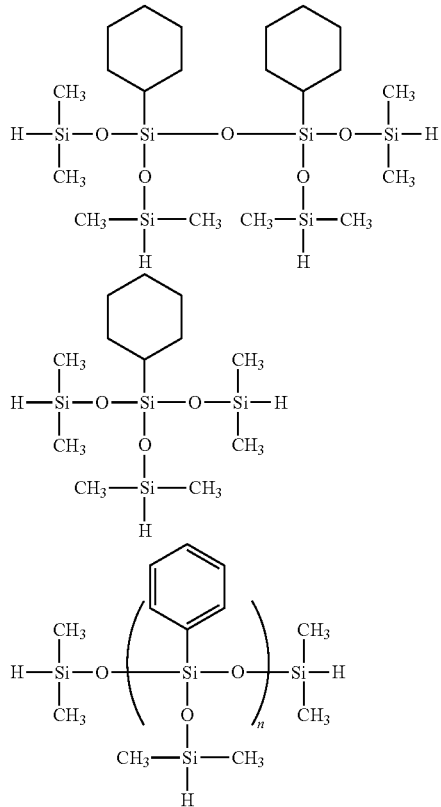

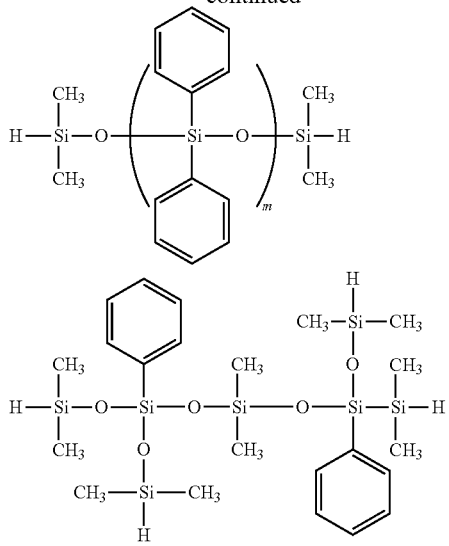

wherein m and n are an integer of from 1 to 10.

The molecular structure of the organohydrogenpolysiloxane may be any of liner, cyclic, branched and three-dimensional network structures. The number of the silicon atoms in one molecule or the degree of polymerization is 3 to 100, preferably 3 to 10.

This organohydrogenpolysiloxane can be prepared according to known methods, for instance, by hydrolyzing chlorosilane represented by $RSiHCl_2$, $R_3SiCl$, $R_2SiCl_2$ or $R_2SiHCl$ wherein R is as defined for $R^7$ and $R^8$ as defined above, or by equilibrating the resulting siloxanes in the presence of a strong acid catalyst.

The organohydrogenpolysiloxans with no cycloalkyl group may be used in combination with the afore-mentioned organohydrogenpolysiloxans having a cycloalkyl group. For good compatibility with the alkenyl group-containing organopolysiloxane (A), it is preferred that the organohydrogenpolysiloxane has a cycloalkyl group content of 0 to 60%, more preferably 5 to 50%, based on the total molar amount of the groups represented by $R^7$ and $R^8$.

(C) Curing Catalyst

The curing catalyst is added to accelerate an addition reaction. The catalyst may be a compound of platinum, palladium or rhodium, and those comprising a metal of the platinum group are preferred in costs. Examples of the catalyst include $H_2PtCl_6 \cdot mH_2O$, $K_2PtCl_6$, $KHPtCl_6 \cdot mH_2O$, $K_2PtCl_4$, $K_2PtCl_4 \cdot mH_2O$, and $PtO_2 \cdot mH_2O$, wherein m is a positive integer, and complexes thereof with a hydrocarbon such as an olefin, an alcohol or an alkenyl group-containing organopolysiloxane. The afore-mentioned catalysts may be used alone or in a combination thereof.

The catalysts may be used in a catalytic amount, preferably 0.0001 to 0.2 part by mass, more preferably 0.0001 to 0.05 part by mass, reduce to a platinum group metal, relative to the total 100 parts by mass of components (A) and (B).

The present silicone resin composition can be obtained by mixing the components (A), (B) and (C). It is preferred that the present silicone resin composition has a cycloalkyl group content of 30 to 80 mass %, more preferably 30 to 50 mass %, based on the total mass of components (A) and (B). If the cycloalkyl group content is less than the aforesaid lower limit, the refractive index is low, so that the thickness of the lens needs to be larger. If the cycloalkyl group content is more than the aforesaid upper limit, steric hindrance occurs. Further, for decreased deformation of a lens, it is preferred that a phenyl group content in the silicone resin composition is infinitely near zero. The silicone resin lens obtained by molding and curing this silicone resin composition into a lens has a large Abbe's number and small differential of refractive indexes against temperatures.

The present silicone resin composition may further comprise additives, if necessary, in addition to components (A), (B) and (C). Examples of the additives include fillers, pigments, phosphors, release agents, antioxidants and ultraviolet absorbing agents. These additives may be properly added in such an amount that the purposes of the present invention are not obstructed.

The antioxidant can be used also as a heat deterioration preventive agent to improve the heat resistance of the silicone resin composition. Hindered phenol antioxidants are preferred as the antioxidant. The amount of the antioxidant ranges from 0.001 to 3 parts by mass, preferably 0.05 to 1 part by mass, more preferably 0.05 to 0.1 part by mass, relative to the total 100 parts by mass of the components (A) and (B). If the amount is larger than the afore-mentioned upper limit, the excessive antioxidant separates out on the surface of the cured product. If the amount is less than the afore-mentioned lower limit, discoloration resistance of the cured product is poor.

Examples of the antioxidant include pentaerythritol tetrakis[3-(3,5-di-tert-butyl-4-hydroxyphenyl)propionate], N,N'-propane-1,3-diylbis[3-(3,5-di-tert-butyl-4-hydroxyphenyl)propionamide], thiodiethylenebis[3-(3,5-di-tert-butyl-4-hydroxyphenyl)propionate], octadecyl-3-(3,5-di-tert-butyl-4-hydroxyphenyl)propionate, 6,6'-di-tert-butyl-2,2'-thiodi-p-cresol, N,N'-hexane-1,6-diylbis[3-(3,5-di-tert-butyl-4-hydroxyphenylpropionamide)], benzenepropanoic acid, 3,5-bis(1,1-dimethylethyl)-4-hydroxy, alkyl ester having C7-C9 side chain, diethyl[[3,5-bis(1,1-dimethylethyl)-4-hydroxyphenyl]methyl]phosphonate, 2,2'-ethylenebis[4,6-di-tert-butylphenol], 3,3',3",5,5',5"-hexa-tert-butyl-a,a',a"-(mesitylene-2,4,6-triyl)tri-p-cresol, calciumdiethylbis[[[3,5-bis(1,1-dimethylethyl)-4-hydroxyphenyl]methyl] phosphonate], 4,6-bis(octylthiomethyl)-o-cresol, 4,6-bis(dodecylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl) propionate], 1,3,5-tris(3,5-di-tert-butyl-4-hydroxybenzyl)-1,3,5-triazine-2,4,6-trione, 1,3,5-tris[(4-tert-butyl-3-hydroxy-2,6-xylyl)methyl]-1,3,5-triazine-2,4,6-(1H,3H,5H)-trione, 6,6'-di-tert-butyl-4,4'-tiodi-m-cresol, diphenylamine, reaction product of N-phenylbenzenamine with 2,4,4'-trimethylpentene, 2,6-di-tert-butyl-4-(4,6-bis(octylthio)-1,3,5-triazin-2-ylamino)phenol, 3,4-dihydro-2,5,7,8-tetramethyl-2-(4,8,12-trimethyltridecyl)-2H-1-benzopyran-6-ol, 2',3-bis[[3-[3,5-di-tert-butyl-4-hydroxyphenyl]propionyl]] propionohydrazide, didodecyl 3,3'-thiodipropionate and dioctadecyl 3,3'-thiodipropionate. These antioxidants may be used also in combination of two or more thereof.

Method for Preparing the Silicone Resin Composition

The present silicone resin composition can be prepared by stirring, melting, mixing and dispersing the aforesaid components altogether or sequentially, if necessary, under heating. The components (A) and (C), and the component (B) are stored preferably in a form of two separate solutions to avoid a curing reaction before use, and mixed at the time of use to cause curing. If the components (B) and (C) are stored together in one solution, a dehydrogen reaction may occur. Therefore, it is preferred to store the component (B) and component (C) separately. Alternatively, a small amount of a cure inhibitor such as acetylenealcohol may be added to a solution of the components (A), (B) and (C) to store.

Any apparatus can be used for the stirring and so on, such as a grinding machine equipped with a stirrer and a heater, a three-roll mill, a ball mill, and a planetary mixer. These apparatuses may be used in combination, if necessary. The viscosity of the present silicone resin composition, as determined at 25 degrees C. with a rotational viscometer, ranges preferably from 100 to 10,000,000 mPa·s, more preferably 300 to 500,000 mPa·s.

The silicone resin composition can be promptly cured by heating, if necessary. Curing conditions may be any conventional ones and selected depending on the use, and usually 40 to 250 degrees C., preferably 60 to 200 degrees C., for 5 minutes to 10 hours, preferably 30 minutes to 6 hours, but are not limited to those.

Method for Preparing a Silicon Resin Lens

The afore-said silicone resin composition is subjected to molding to prepare a silicone resin lens according to any method, such as injection molding or transfer molding. The cure shrinkage ratio of a molding product depends on molding conditions, such as a molding temperature, a molding pressure and a molding time and, therefore, in general, post-cure is conducted to ensure desired properties of the molded.

Any conventional injection molding instrument can be used. In general, silicone resin compositions are stored in a form of two separate solutions. Therefore, any injection molding instrument with a system which can supply the two liquid resin solutions can be used. Molding conditions include a molding temperature of 100 to 170 degrees C., preferably 120 to 150 degrees C., a molding pressure of 1 to 100 MPa, and a molding time of 0.5 to 20 minutes. A molding shrinkage ratio of a resin depends on a cure degree of a molded, and the ratio can be made smaller by a longer molding time, but it is less preferred because a longer molding time deteriorates productivity.

A shrinkage ratio of the silicone resin lens after molding differs from a shrinkage ratio after post cure, depending on a molding temperature. There is a molding temperature where the shrinkage ratio after molding is almost same as the shrinkage ratio after post cure. See Example 1 and FIG. 1. A molding shrinkage ratio depends on reactivity of a silicone resin composition. If a curing rate is faster, a molding temperature where a shrinkage ratio after molding is almost same as a shrinkage ratio after post cure is lower. Silicone resins have larger expansion coefficients, compared to other resins and, therefore, it is difficult to form products, such as lens, which have the same dimensions by controlling the shrinkage ratio. However, a silicone resin lens having good accuracy of dimensions can be prepared by a process where a mold is designed, preliminarily taking a shrinkage ratio into consideration, and a molding temperature is such that the two shrinkage ratios are almost same.

Preferably, the silicone resin lens is molded in a molding temperature condition where the ratio of the shrinkage ratio after post cure to the shrinkage ratio after molding is 0.8 to 1.2, more preferably 0.9 to 1.1, whereby, a lens has good accuracy of desired dimensions.

The present silicone resin lens has a higher Abbe's number and a small differential of refractive indexes against temperatures, compared to conventional silicone resin lenses. Therefore, the present lens has a lower double refraction of light, better stability for temperatures and less distortion of an image, and is suitable for use in forming an image. Further, according to the present method, a lens having accuracy of dimensions can be provided.

EXAMPLES

The present invention will be explained below in further detail with reference to a series of the Examples and the Comparative Examples, though the present invention is in no way limited by these Examples. In the following descriptions, the amount of a cycloalkyl group, %, is % by mass, based on the total mass of the organosiloxane (A) and the organohydrogenpolysiloxane (B).

Synthesis Example 1

In a flask, placed were 1050 g of xylene, 3652 g of water, 2625 g of 12 mols/L HCl (31.5 mols). To the resulting mixture, was dropwise added a mixture of 2146 g of cyclohexyltrimethoxysilane (10.5 mols), 543 g of vinyl dimethyl chlorosilane (4.50 mols) and 1504 g of xylene, and stirred for 3 hours. The acid was separated, and the resulting mixture was washed with water. The remaining mixture was subjected to azeotropic dehydration. Then, 6 g of KOH (0.15 mols) was added to the resulting mixture and heated at 150 degrees C. to reflux through the night. Then, the reaction mixture was neutralized with 27 g of trimethylchlorosilane and 24.5 g of potassium acetate, filtered and, subsequently, subjected to stripping under reduced pressure to remove the solvent to obtain the organopolysiloxane having a three-dimensional network structure (Resin 1) represented by the following formula. The vinyl equivalent was 0.203 mol/100 g.

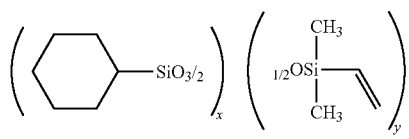

wherein x:y=7:3.

Synthesis Example 2

A mixture of 698 g of phenyl trichlorosilane, 169 g of methylvinyldichlorosilane, 194 g of dimethyldichlorosilane and 530 g of toluene was dropwise added to 2500 g of water over 60 minutes while vigorously stirring. The resulting mixture was stirred for further 60 minutes and washed with water to become neutral. Then, a solution containing 25 wt % of siloxane in toluene was prepared. To the resulting mixture, 0.42 g of potassium hydroxide was added, subjected to polymerization reaction with heating to reflux for 5 hours. Then, to the resulting mixture, 13.8 g of trimethylchlorosilane was added, stirred at room temperature for 60 minutes to neutralize the base and, subsequently, filtered and subjected to stripping with heating at reduced pressure to remove toluene to thereby obtain a transparent organopolysiloxane having a three-dimensional network structure (Resin 4). The vinyl equivalent was 0.187 mol/100 g.

Figure 2:
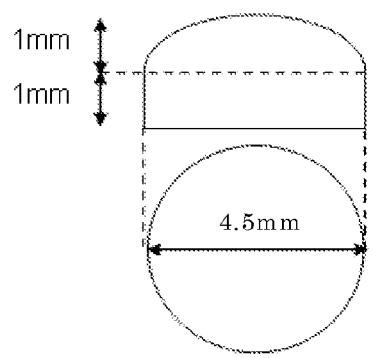
FIG. 2 is a schematic view of an example of the lens prepared from the present silicone resin composition.

100 G of the organopolysiloxane prepared in Synthesis Example 1 (Resin 1), 29.4 g of the hydrogenpolyorganosiloxane 1 represented by the following structure,

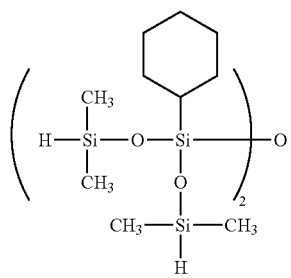

and 0.1 g of an alcohol solution of chloroplatinic acid containing 2 mass % of platinum were uniformly mixed, and subjected to molding at a molding temperature of 165 degrees C. and an injection pressure of 10 MPa·s for 3 minutes with an injection molding instrument for a liquid silicone rubber where a mold for forming a lens had a diameter of 4.5 mm at room temperature, as shown in FIG. 2.

The dimension of the each product was measured at room temperature and an average molding shrinkage ratio was calculated from the results of five products. Further, the products were further cured in post cure conditions at 150 degrees C. for 4 hours, and the dimension of each of the cured products thus obtained was measured at room temperature and an average molding shrinkage ratio after post cure was calculated. In Reference Examples 1 to 3, the procedures in Example 1 were repeated except that the molding temperature was 140 degrees C., 150 degrees C. or 180 degrees C., respectively. The molding shrinkage ratio and the shrinkage ratio after post cure of each of the products were calculated.

The molding shrinkage ratios were calculated by the following equations where room temperature was 25 degrees C. The results are as shown in Table 1 and FIG. 1.

Shrinkage ratio after molding (%)={[diameter of a lens in a mold at room temperature−diameter of a lens after molding]/diameter of a lens in a mold at room temperature}×100

Shrinkage ratio after post cure (%)={[diameter of a lens in a mold at room temperature−diameter of a lens after post cure]/diameter of a lens in a mold at room temperature}×100

In Table 1, the ratio of shrinkage ratios is a ratio of the molding shrinkage ratio after post cure to that after molding.

TABLE 1

| | Molding temperature, degrees C. | Molding time, min. | Molding shrinkage ratio after molding, % | Molding shrinkage ratio after post cure, % | Ratio of shrinkage ratios |
|---|---|---|---|---|---|
| Ref. Ex. 1 | 140 | 3 | 2.24 | 2.90 | 1.29 |
| Ref. Ex. 2 | 150 | 3 | 2.78 | 3.06 | 1.10 |
| Ex. 1 | 165 | 3 | 3.37 | 3.24 | 0.96 |
| Ref. Ex. 3 | 180 | 3 | 4.07 | 3.45 | 0.85 |

As seen in Table 1 and FIG. 1, a ratio of the shrinkage ratios was nearest to 1.0 in the product with the molding temperature of 165 degrees C. Therefore, the molding at this molding temperature can provide a lens having good accuracy of dimensions with almost no dimension change. Accordingly, the silicone resin lenses were molded at a molding temperature of 165 degrees C., as described below.

Example 2

100 G of the organopolysiloxane which had a viscosity of 4000 mPa·s and was represented by the following structure (Resin 2),

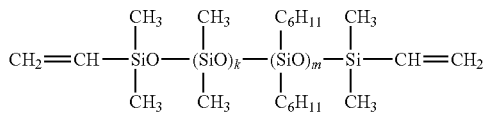

wherein k is 68 and m is 30, 2.55 g of the organohydrogenpolysiloxane 2 represented by the following structure,

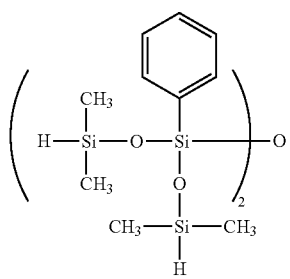

and 0.1 g of an alcohol solution of chloroplatinic acid containing 2 mass % of platinum were uniformly mixed, and subjected to molding according to the method used in Example 1 to obtain a silicone resin lens.

Comparative Example 1

100 G of the organopolysiloxane which had a viscosity of 5,000 mPa·s and was represented by the following structure (Resin 3),

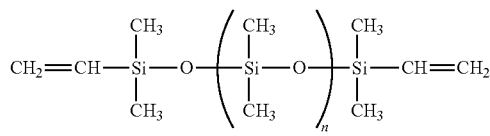

wherein n is 450, the weight-average molecular weight is 33486, and the vinyl equivalent is 0.006 mol/100 g, 0.4 g of the organohydrogenpolysiloxane 3 represented by the following structure,

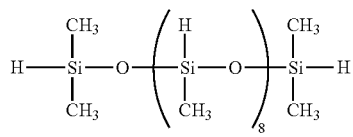

and 0.1 g of an alcohol solution of chloroplatinic acid containing 2 mass % of platinum were uniformly mixed, and subjected to molding according to the method used in Example 1 to obtain a silicone resin lens.

Comparative Example 2

100 G of the organosiloxane prepared in Synthesis Example (Resin 4), 30 g of the organohydrogenpolysiloxane 4 represented by the following structure,

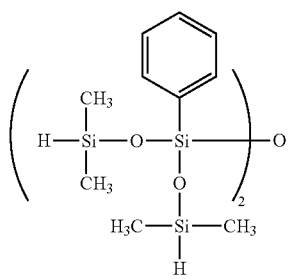

and 0.1 g of an alcohol solution of chloroplatinic acid containing 2 mass % of platinum were uniformly mixed, and subjected to molding according to the method used in Example 1 to obtain a silicone resin lens.

The properties of the silicone resin lenses prepared in Examples 1 and 2, and Comparative Examples 1 and 2 were determined according to the following methods. The results are as shown in Table 2.

Refractive Index

Refractive indexes of each of the cured products thus obtained were determined at wavelengths of 429.5nm, 539.0 nm, and 632.8 nm at measurement temperatures of from 23 to 100 degrees C., using 2010 Prism Coupler, ex Metricon Co. Ltd. The dispersion curve was drawn by the Sellmeier equation: $R(\lambda)=a+b/(\lambda 2-c2)$, and then refractive indexes at wavelengths of 400 nm and 596 nm were determined. The ratio of the refractive index at 400 nm "$R_{400}$" to the refractive index at 596 nm "$R_{596}$", "$R_{400}/R_{596}$", was calculated from the refractive indexes thus obtained.

Abbe's Number

Refractive indexes of each of the cured products thus obtained were determined at wavelengths of 429.5 nm, 539.0 nm, and 632.8 nm at measurement temperatures of from 23 to 100 degrees C., using 2010 Prism Coupler, ex Metricon Co. Ltd. The dispersion curve was drawn by the Sellmeier equation: $R(\lambda)=a+b/(\lambda 2-c2)$, and then refractive indexes at wavelengths of 486 nm, 589 nm and 656 nm were determined. Each of the refractive index was indicated as n(486), n(589) and n(656), respectively. The Abbe's number was calculated by the following equation.

Abbe's number=$(n(589)-1)/(n(486)-n(656))$

Determination of a Differential of Refractive Indexes Against Temperatures

Refractive indexes of each of the cured products thus obtained were determined at wavelengths of 632.8 nm at measurement temperatures of from 25 to 100 degrees C., using 2010 Prism Coupler, ex Metricon Co. Ltd. The differential of refractive indexes "n" against temperatures "T", "dn/dT", was calculated.

TABLE 2

| | | Ex. 1 | Ex. 2 | Com. Ex. 1 | Com. Ex. 2 |
|---|---|---|---|---|---|
| Components of the silicone resin compositions, parts by mass | | | | | |
| (A) | Regin 1 | 100 | | | |
| | Regin 2 | | 100 | | |
| | Regin 3 | | | 100 | |
| | Regin 4 | | | | 100 |
| (B) | Organohydrogen-polysiloxane1 | 29.4 | | | |
| | Organohydrogen-polysiloxane2 | | 2.55 | | |
| | Organohydrogen-polysiloxane3 | | | 0.4 | |
| | Organohydrogen-polysiloxane4 | | | | 30 |
| (C) | Curing catalyst | 0.1 | 0.1 | 0.1 | 0.1 |
| | Si—H/Si-Vi, molar ratio | | 1.1 | | |
| | Amount of the cyclohexyl group, % | 43.3 | 41.2 | 0 | 0 |
| Properties of the Silicone resin lens | | | | | |
| Refractive index at 400 nm | | 1.52 | 1.59 | 1.42 | 1.55 |
| Refractive index at 596 nm | | 1.54 | 1.55 | 1.41 | 1.52 |
| $R_{400}/R_{596}$ | | 1.013 | 1.025 | 1.007 | 1.0197 |
| Abbe's number | | 50 | 51 | 44 | 35 |
| Differential of refractive indexes against temperatures, ×10$^{-6}$/° C. | | −159 | −240 | −350 | −255 |

As seen in Table 2, the silicone resin lenses of the present invention had high refractive indexes, small Abbe's number, and small differential of refractive indexes against temperatures.

INDUSTRIAL APPLICABILITY

In the silicone resin lens of the present invention shows a reduced double refraction of light and less distortion of an image, and has good stability to a temperature. Therefore, the lens can provide a precise image. Further, according to the present method, a lens having accuracy of dimensions can be provided. Therefore, the present silicone resin lens is suitable for use in forming an image.

The invention claimed is:

1. A silicone resin lens obtained by molding and curing a silicon resin composition into a lens, wherein the lens has a refractive index at 400 nm of 1.5 or more, a ratio of a refractive index at 400 nm to a refractive index at 596 nm of 1.01 or more, an Abbe's number of 45 or more, and an absolute value of a differential of refractive indexes against temperatures, dn/dT, of $250 \times 10^{-6}$/degrees C. or less, wherein the silicon resin composition comprises (A) an alkenyl group-containing organopolysiloxane represented by the following average compositional formula (1):

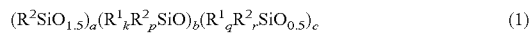
(1)

wherein $R^1$ is an alkenyl group having 2 to 8 carbon atoms, $R^2$ is a substituted or unsubstituted monovalent hydrocarbon group which is not an alkenyl group, k and p are an integer of 0, 1 or 2, provided that a total of k and p is 2, q is an integer of from 1 to 3 and r is an integer of from 0 to 2, provided that a total of q and r is 3, a, b and c are the numbers which satisfy the molar ratio equations, (b+c)/a=0.01 to 1, and c/a=0.05 to 3, and 10 to 80% of a total molar amount of the groups represented by $R^1$ and $R^2$ is a cycloalkyl group, (B) an organohydrogenpolysiloxane having at least two hydrogen atoms each bonded to a silicon atom in an amount such that the amount of the hydrogen atoms is 0.75 to 2.0 equivalents per equivalent of the alkenyl groups of component (A), and (C) a catalytic amount of a curing catalyst.

2. The silicone resin lens according to claim 1, wherein the amount of the cycloalkyl group is 30 to 80 mass %, based on the total amount of components (A) and (B).

3. A method for preparing the silicone resin lens of claim 1 or 2, wherein the silicone resin lens is prepared in conditions where a ratio of a molding shrinkage ratio found after subjecting the silicone resin composition to post-cure to a molding shrinkage ratio found after subjecting the silicone resin composition to molding is 0.8 to 1.2.

* * * * *